United States Patent [19]

D'Entremont

[11] E Re. 31,367

[45] Reissued Aug. 30, 1983

[54] MOTOR STARTING AND PROTECTING APPARATUS

[75] Inventor: John R. D'Entremont, Foxboro, Mass.

[73] Assignee: Texas Instruments Incorporated, Dallas, Tex.

[21] Appl. No.: 934,101

[22] Filed: Aug. 15, 1978

Related U.S. Patent Documents

Reissue of:

[64] Patent No.: 4,092,573
Issued: May 30, 1978
Appl. No.: 709,673
Filed: Jul. 29, 1976

U.S. Applications:

[63] Continuation-in-part of Ser. No. 642,858, Dec. 22, 1975, abandoned.

[51] Int. Cl.[3] ..... H02H 7/085

[52] U.S. Cl. ..... 361/27; 361/24; 361/31; 361/106; 318/783; 318/785; 318/788; 318/791; 338/220; 337/100; 337/102; 310/68 C

[58] Field of Search ..... 361/24–29, 361/31, 32, 103, 105, 106; 318/782, 783, 784, 785, 788, 791, 792; 338/22 SD, 13, 220; 337/100, 102, 107; 310/68 R, 68 C

[56] References Cited

U.S. PATENT DOCUMENTS

| | | | |
|---|---|---|---|
| 3,521,138 | 7/1970 | Enemark et al. | 318/791 |
| 3,695,054 | 10/1972 | Barry | 361/27 X |
| 3,858,140 | 12/1974 | Hancock | 361/27 X |
| 3,921,117 | 11/1975 | Blaha | 318/471 X |
| 3,965,392 | 6/1976 | Moorhead et al. | 361/29 |
| 4,037,316 | 7/1977 | Stoll | 361/27 X |
| 4,042,860 | 8/1977 | Woods et al. | 361/25 |
| 4,084,202 | 4/1978 | Stoll | 361/29 X |
| 4,086,558 | 4/1978 | Pejouhy et al. | 361/29 X |

FOREIGN PATENT DOCUMENTS

| | | | |
|---|---|---|---|
| 2342015 | 3/1975 | Fed. Rep. of Germany | 318/471 |

*Primary Examiner*—Patrick R. Salce
*Attorney, Agent, or Firm*—John A. Haug; James P. McAndrews; Melvin Sharp

[57] ABSTRACT

A combination starting and protecting device particularly useful with split phase motors such as those used with refrigeration compressors is disclosed in which an element of material having a positive temperature coefficient (PTC) of resistivity characteristic and a thermally responsive switch are disposed in the same housing. A thermal coupling of a preselected value between the PTC element and the thermally responsive switch is provided so that a desired reset or "off" time is obtained for the thermally responsive switch without affecting the "on" time.

13 Claims, 5 Drawing Figures

MOTOR STARTING AND PROTECTING APPARATUS

Matter enclosed in heavy brackets [ ] appears in the original patent but forms no part of this reissue specification; matter printed in italics indicates the additions made by reissue.

This is a continuation-in-part of application Ser. No. 642,858 filed Dec. 22, 1975, now abandoned.

This invention relates to the starting and protecting of electric motors and more particularly to the starting and protecting of split phase motors commonly used with refrigerator compressors.

It is conventional to provide electro-mechanical relays for starting such motors and motor protectors for preventing damage to the motors should a fault condition occur. U.S. Pat. Nos. 3,099,732, 3,168,661 and 3,248,627 disclose devices in which both relay and protector functions are combined in a single package. Such a package facilitates simple and low cost installation on motors to which they are to be connected and insure that the motors are properly protected. The protectors in such combination packages typically comprise a bimetallic element through which the motor current passes. The element is capable of assuming contacts open and contacts closed positions depending upon the temperature of the element. In order to provide protection against all types of fault conditions the protector must be sensitive to motor temperature as well as motor current. As set forth in the referenced patents provision is made to either thermally isolate the protector from the relay so that they operate independently of one another so that any heat produced by the relay will not adversely affect the calibration of the protector or, as disclosed in U.S. Pat. No. 3,248,627, to closely thermally couple the protector with relay coil so that the coil can act as an analog of the motor windings. That is, the coil carries the same current as the main winding and thus $I^2R$ heat is generated in the coil in direct proportion to $I^2R$ heat generated in the main winding. This latter approach has limitations in its effectiveness since the thermal capacity of the motor is so much greater than that of the relay.

More recently a more economical and reliable way to start split phase motors has been developed which involves the use of positive temperature coefficient (PTC) of resistivity material electrically coupled to the start winding. Upon initial energization the PTC material is in a cold or low resistance mode thereby permitting a relatively large current to pass through the start winding. As the motor reaches its running speed the PTC material heats up and goes into a high resistance mode effectively deenergizing the start winding. An example of this type of starting device is set forth in British Patent Specification No. 1,042,126. Protection of the motor in this system is provided separately. As with the electro-mechanical relay and protector combination units it would be desirable to combine the starting and protecting functions into the same device for reasons of economy. Further, it is desirable that the motor protector sense the temperature of the compressor shell since the shell temperature is indicative of the internal temperature of the compressor. The protector can follow the shell temperature more closely if it is not exposed to air currents surrounding the compressor. The housing generally used to cover the terminals of the protector and starter would help shield the protector from these air currents. However, when the protector is mounted on the motor casing as shown by the patents cited supra, other problems are presented, particularly when used in compressor applications. That is, during normal operation of a refrigeration compressor there exists a high differential pressure between the evaporator and the condenser. When the compressor is deenergized some time is required for the pressures to equalize so that the torque required to turn the pump decreases to a level which is lower than the starting torque of the motor. In many domestic refrigerators this is in the order of a half minute to five minutes. If restarting is attempted too soon after deenergization with the differential pressure still too high the motor acts as though it has a locked rotor and burn out of the winding can occur unless effective protection is provided. When the rotor is locked the rate of temperature rise of the motor winding is much too fast to cause any appreciable temperature rise of the motor casing before the temperature of the motor winding becomes excessive so that protection which relies solely on sensing of the casing temperature is inadequate. Attempting start up during a locked rotor condition will result in an abnormally high current level being drawn in an attempt to develop the torque necessary to overcome the starting load. If the motor casing is relatively cool when the rotor becomes locked the protector may cycle many times before the casing is heated sufficiently to contribute to the protector's effectiveness by decreasing its on time and increasing its off time.

Thus it is desirable to increase the off time of the protector. This could be done by reducing its reset temperature however this is undesirable for several reasons. First a lowered reset temperature could cause the protector to stay off for too long a period of time when the casing and ambient temperatures are high such as after a running overload has caused the protector to trip. Further, as the differential (between trip and reset temperature) of a motor protector disc is widened its life is shortened. Mounting the PTC starter thermally isolated from the protector, in the same manner as disclosed in U.S. Pat. Nos. 3,099,732 and 3,168,661 would not alleviate this problem. On the other hand since the PTC element in the starting device reaches a relatively constant temperature within a few milli-seconds it could not be used as an analog in the manner taught by U.S. Pat. No. 3,248,627.

It is an object of this invention to provide a novel and improved solid state motor starter and protector combination package, one which is particularly adapted for use in starting and protecting split phase electrical motors used with compressors; to provide such a combination package which is easily applied to different compressors and which is of very compact and economical construction; to provide such combination packages which facilitate easy mounting to a motor and ensures not only effective starting but also complete protection.

Briefly, the present invention relates to a combination starting and protecting device for an electric motor of the type having a main or running winding and an auxiliary or starting winding, commonly referred to as a split phase motor. The device includes an element of material which has a resistance characteristic with a positive temperature coefficient (PTC) and a sharply defined anomaly or transition temperature above which the elements resistance increases sharply. The device also includes a thermally responsive member such as a snapacting disc mounting a movable contact and so arranged that upon an increase in temperature of the disc to a predetermined level, it will snap from a contacts closed to a contacts open configuration. The disc is electrically coupled to line current so that snapping of the disc to the open contacts configuration deenergizes the motor. The thermally responsive member is thermally coupled to the PTC element which heats up to its operating temperature almost instantaneously when power is applied and thereby supplies a heat reservoir which furnishes heat to the thermally responsive member when power is removed increasing the off time of the member. Thus the disc is maintained in its contacts open configuration for a preselected extended period of time allowing the motor and the PTC element to cool to a desired level.

The invention accordingly comprises the construction hereinafter described, the scope of the invention being indicated in the appended claims.

In the accompanying drawings, in wich several of various possible embodiments of the invention are illustrated:

Corresponding reference characters indicate corresponding parts throughout the several views of the drawings.

Figure 1:
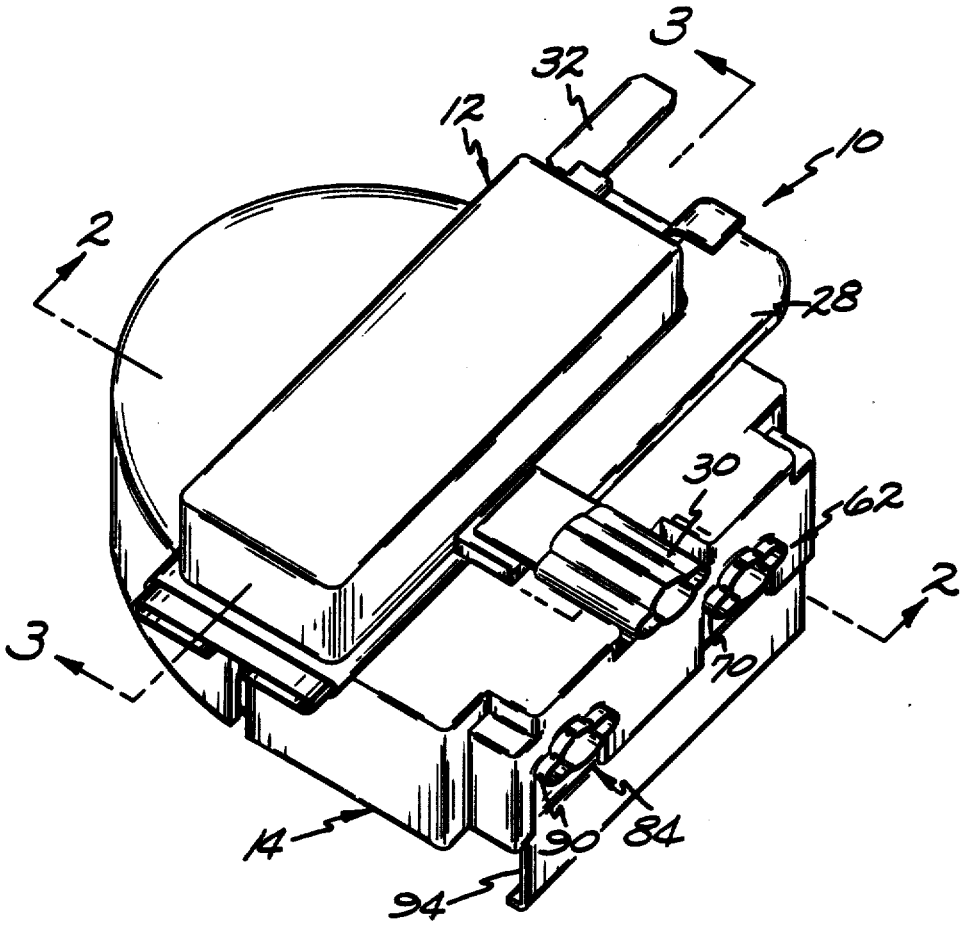
FIG. 1 is a perspective view of a starter/protector combination device made in accordance with the invention.
Figure 2:
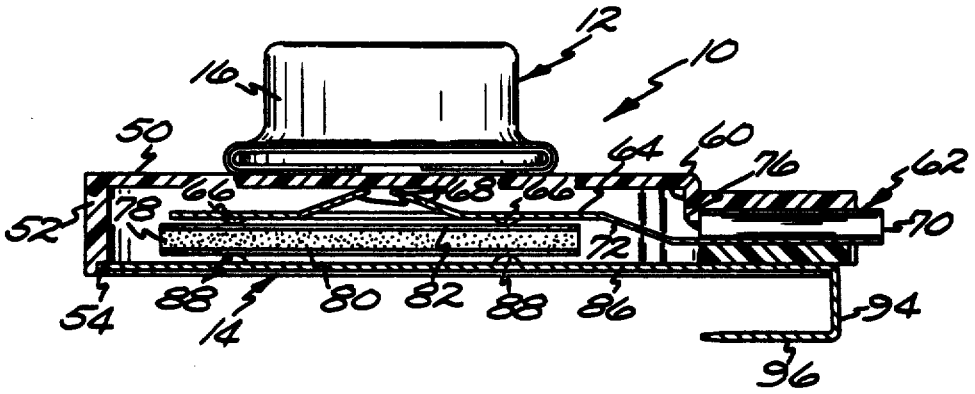
FIG. 2 is a side view of the FIG. 1 device with the starter portion shown in cross-section along lines 2—2 of FIG. 1.
Figure 3:
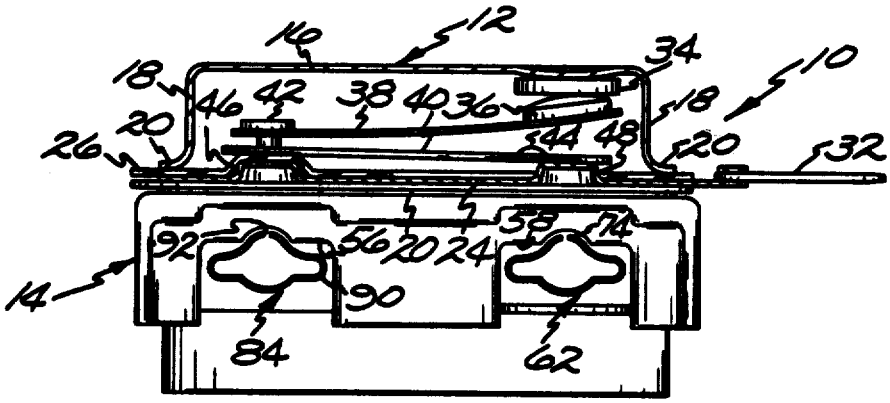
FIG. 3 is a front view of the FIG. 1 device with the protector portion shown in cross-section along lines 3—3 of FIG. 1.

Referring now to FIGS. 1–3 a motor protector/-starter package made in accordance with the invention is identified by reference numeral 10 comprising a motor protector portion 12 and a starter portion 14. As best seen in FIG. 3, motor protector 14 comprises and electrically and thermally conductive housing or can 16 formed of any suitable material such as low carbon steel having a top wall and depending side walls 18 forming a cavity therein. Attached to the free end of side walls 18 around the perimeter is an outwardly extending flange 20. A lip portion 22 is provided on two opposite sides which is bent over to clampingly engage a lid 24. Interposed between can 16 and lid 24 is an electrically insulative gasket 26 to electrically separate lid 24 from the can 16. As seen in FIG. 1, gasket 26 is folded around two opposite edges of lid 24. A terminal 28 is electrically connected to can 16 by welding or other suitable means and is formed into a connector sleeve 30 (see FIG. 1) aligned with other connector sleeves from relay 14 to be discussed infra. Another terminal 32 of the bayonet variety is electrically connected, as by welding, to lid 24.

Attached, as by welding, to the top wall of can 16 is a stationary contact 34 made from a material of high electrical conductivity such as silver. Positioned to be movable into and out of engagement with stationary contact 34 is a movable contact 36 preferably made from the same material as contact 34. Movable contact 36 is welded or otherwise secured at one end of a thermally responsive bimetallic member 38, such as a dish-shaped member having one layer of metal of a low thermal coefficient of expansion and another layer of metal of a relatively higher thermal coefficient of expansion so that upon heating and cooling of member 38 it will snap between a first configuration in which contacts 34, 36 are in engagement as seen in FIG. 3 and a second configuration in which contacts 34, 36 are out of engagement.

The end of member 38 opposite contact 36 is suitably attached in cantilever fashion by welding to a flat heater element. A welding slug 42 is conveniently employed to mount bimetallic member 38 to an end of heater 40 but slightly spaced therefrom. A dimple 44 is formed in heater 40 and acts as a stop for bimetallic member 38. Heater 40 is formed of any one of a variety of materials of selected electrical conductivity so that the element is adapted to generate a predetermined amount of heat in response to a selected flow of electrical current therethrough. For example, heater element 40 may be formed of rigid cold-rolled steel to provide the element with stability and selected electrical heating characteristics.

Lid 24 is formed with two indented portions, portion 48 serving as a mount for the heater 40 to which it is attached as by welding. Indented portion 46 serves to position the mounted end of the bimetallic member in a desired location relative to stationary contact 34. Gasket 26 is provided with a cut out portion through which indented portion 48 of lid 24 extends.

Protector 12 is calibrated by bending can 16 at stationary contact 34 until the desired force is exerted on movable contact 36. The free end of heater 40 is in close physical proximity to indented portion 46 of lid 24 covered by gasket 26. This facilitates calibration since the mounted end of the bimetallic member 38 is kept from moving while can 16 is being bent. Further information on a motor protector of the type described above may be found in U.S. application Ser. No. 535,634 filed Jan. 10, 1975, which issued Mar. 29, 1977 as U.S. Pat. No. 4,015,229 and is assigned to the assignee of the instant application.

Relay or starter portion 14 comprises a generally cup-shaped casing 50 having a top and a depending side wall 52 forming a casing cavity which is open at one end and which has a groove 54 extending around the open end. As shown, the casing rim preferably has a slotted portion indicated by the slots 56 and 58. Preferably the casing has an additional wall 60 depending from the casing top in spaced adjacent relation to the slotted portion of the casing. The casing 50 is formed of an electrically insulative or dielectric material and is preferably formed of a relatively rigid material such as a thermoplastic polyester or the like.

A first electrically conductive metal terminal 62, preferably formed of stiffly resilient material such as plated phosphor bronze, beryllium copper, steel or the like is disposed within the casing 50. As shown, the first terminal preferably has a plate portion 64 provided with a plurality of raised projections 66 thereon and has integral spring legs 68 extending upwardly from the plate portion 64 to resiliently bear against the casing top. The first terminal has a connector portion 70 extending through the casing sidewall. Preferably, for example, the connector portion 70 is integral with the plate portion of the terminal and has the form of a metal sleeve of selected length connected to the plate portion 64 by an intermediate connector part 72 and split, as indicated at 74, one end 76 of the sleeve being engaged with the additional wall 60 of the casing for locating the terminal laterally within the casing with the sleeve extending through slot 58 in the casing sidewall.

A resistor element 78 is also disposed within the casing cavity. Preferably the resistor element 78 is formed of a ceramic material such as lanthanum-doped barium titanate having a positive temperature coefficient of resistivity. Preferably the selected material is adapted to be self-heated by directing electrical current through the resistor material and is adapted to display a sharp and very large increase in electrical resistance when heated to a selected temperature for reducing current flow through the material to a very low level and for thereby limiting the heating of said resistor material to approximately that selected temperature level. As shown, the resistor element 78 is preferably in disc form and has contact surfaces 80 and 82 formed thereon by metallizing or the like in any conventional manner for facilitating electrical contact to the resistor element. The contact surface 82 of the resistor element is disposed on the projections 66 on the first terminal 62 in electrical engagement with that terminal.

The solid state starter portion 14 further includes a second electrically conductive metal terminal 84. The second terminal 84 has a plate portion 86 which rests on the casing shoulder or groove 54 as shown in FIG. 2 for closing the opening end of the casing. As shown, the plate portion 86 has a plurality of projections 88 formed thereon for electrically engaging the contact surface 80 of the resistive element 78. The second terminal also has a connector portion 90, preferably in the form of a metal sleeve split at 92 and welded or otherwise connected to the terminal plate portion 86 and extending through the casing slot 56, the connector sleeve 90 also having an end engaged by the additional wall 60 of the casing for assisting in locating the second terminal relative to the casing. As shown, particularly in FIG. 1, the second terminal 84 preferably has a down turned flange portion 94 having one or more blade terminals, such as blade 96 extending from the flange space below the plate portion of the terminal 84.

Further information on a solid state starter of the type described above may be found in U.S. application Ser. No. 528,066 filed Nov. 29, 1974, which issued on Nov. 18, 1975 as U.S. Pat. No. 3,921,117 and is assigned to the assignee of the instant invention.

The PTC element tends to stabilize the air temperature within the casing with the result that the protector can sense compressor heat more effectively because of its juxtaposition to the compressor shell and its electrical connections to the header.

Motor protector portion 12 is affixed to starter portion 14 so that a preselected thermal path 98 exists between PTC element 78 and thermostatic member 38. Since the PTC element heats up to its operating temperature almost instantaneously when power is applied it serves as a heat reservoir which furnishes heat to the thermostatic member 38 of the protector when power is removed and increases the off time of the protector. For a resistive element 78 having a mass of 5.8 grams a thermal resistance of between approximately 5°-9° C./watt between the resistor element 78 and protector can 16 will result in a satisfactory reset time. Preferably, the thermal resistance should be approximately 7° C./watt which results in between approximately half a minute and 3 minutes rest which permits the compressor pressures to equalize sufficiently to permit restarting and provides sufficiently long off time to avoid the deleterious results mentioned supra. It will be understood that the thermal resistance between the resistor element 78 and the thermostatic element 38 can be readily adjusted by interposing therebetween selected thermal conductors or carriers.

The particular construction shown in the drawings and with the aforementioned element 78 of 5.8 grams, had a thermal capacitance of 2.87 watt sec/° C. and casing 50 had a thermal capacitance of 2.6 watt sec/° C. The thermal capacities of the various elements may be varied to provide optimum performance for a particular compressor.

Another way of defining thermal path 98 between resistor element 78 and thermostatic element 38 in accordance with this invention is to compare it with the change in off time of thermostatic element 38 when the thermal resistance of path 98 approaches infinity, e.g. when the PTC starter is thermally isolated from the protector as disclosed in the aforementioned U.S. Pat. Nos. 3,099,732 and 3,168,661, under a condition of locked rotor. The off time will be increased from 50% to 300% pursuant to the invention versus the same resistor element and protector with a thermal resistance of infinity therebetween. In addition, under steady state conditions of compressor operation the thermal resistance of path 98 and the thermal capacity of resistor element 78 is adjusted so that the increase in effective ambient temperature in the vicinity of the thermostatic element 38 is raised not less than 10° C. and not more than 60° C.

Figure 4:
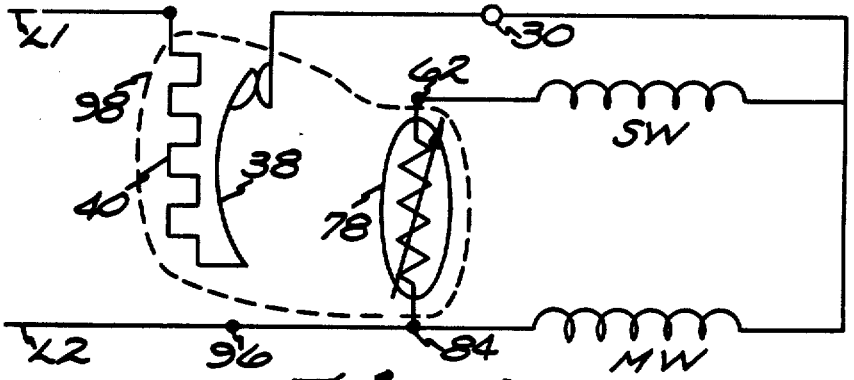
FIG. 4 is a schematic circuit diagram of the FIG. 1 embodiment employed with a split phase motor.
Figure 5:
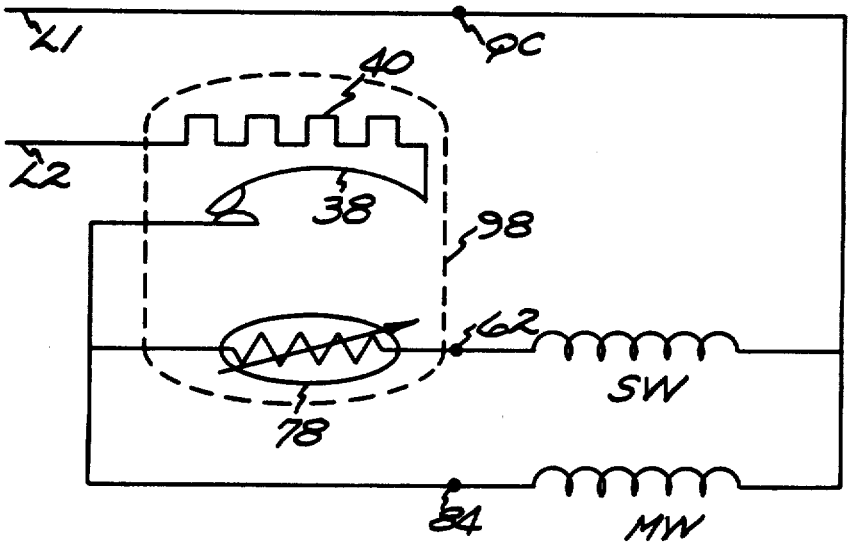
FIG. 5 is a schematic circuit diagram similar to FIG. 4 but of an alternative embodiment of this invention.

FIGS. 4 and 5 show two ways the combination motor protector starter 10 can be employed with a typical split-phase motor having a start winding SW and a main winding MW. As seen in FIG. 4, line L2 is connected to terminal 96, one side of PTC element 78 and main winding terminal 84. The other side of PTC element 78 is connected to start winding terminal 62. The other side of the windings are connected to terminal 30 of motor protector portion 12. Line L1 is connected to terminal 32 of motor protector portion 12. Thus, upon initial energization PTC element 78 is at ambient temperature and therefore has a relatively low level of resistance. Current is allowed to pass through both windings MW and SW until the $I^2R$ heating in PTC element 78 causes its temperature to increase above its anomaly point above which point its resistance suddenly increases to a high level effectively deenergizing the start winding SW. Current continues flowing through the main winding thermostatic member 38 and heater 40. Heater 40 is not always necessary, however, it is generally employed since it is beneficial in making the protector current sensitive. Should an overload occur, either through locked rotor, overcurrent, etc., thermostatic member 38 will move to its open contacts configuration thereby deenergizing the motor. Except for the few milliseconds during starting when PTC element 78 is at a temperature below its anomaly it is maintained at a relatively high and constant temperature. Since the mass of element 78 is substantial it constitutes a heat reservoir. When power is removed from the circuit (e.g. when contacts 34, 36 open) the heat from the reservoir flows to member 38 via thermal path 98 maintaining member 38 above its reset temperature for an extended period of time keeping it in its open contacts configuration for a given period of time while the motor has a chance to cool off and the compressor pressures balance. This will be on the order of 0.5-3 minutes or more if locked rotor conditions persist.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A combination motor starter and protector apparatus comprising:

a starter portion including a housing, terminal means mounted in the housing for connecting a motor starter and protector apparatus to a motor and a source of power, an element composed of positive temperature coefficient (PTC) of resistivity material disposed in the housing, electrical lead means connecting the element to the terminal means, a protector portion including first and second electrical contacts disposed in the housing electrically connected to the terminal means, the contacts movable relative to one another into and out of engagement, a thermostatic member disposed in the housing and operatively connected to the set of contacts, the thermostatic member adapted to move from a first configuration in which the contacts are in engagement to a second configuration in which the contacts are out of engagement and back to the first configuration, the contacts interposed between the source of power and the motor so that when the contacts are out of engagement the motor is deenergized, and selected thermal resistance means *between approximately 5°-9° C./watt disposed* between the PTC element and the protector portion.

2. Apparatus according to claim 1 in which the thermostatic member is a snap acting bimetallic member having a free end portion and one of the first and second electrical contacts is contact mounted on the free end portion.

[3. Apparatus according to claim 1 in which the said thermal resistance is between approximately 5°-9° C./watt.]

4. Apparatus according to claim [3] *1* in which the said thermal resistance is approximately 7° C./watt.

5. Apparatus according to claim 1 further including a heater disposed in the housing, the heater thermally coupled to the thermostatic member.

6. Apparatus according to claim 1 in which the thermostatic member is serially connected to the PTC element.

7. Apparatus according to claim 1 in which the terminal means includes connectors adapted to connect the thermostatic element to one power line and the PTC element to another power line.

8. Apparatus according to claim 6 further including a heater serially connected to the thermostatic member.

9. Apparatus according to claim 1 further including a heater physically interposed between the thermostatic member and the PTC element.

10. Refrigeration apparatus comprising a compressor, a motor having a start and a run winding for driving the compressor, an element composed of material having a positive temperature coefficient (PTC) of resistivity above an anomaly temperature, the element coupled to the start winding, means to connect the element to a source of power so that upon energization of the element a relatively large inrush of current flows through the element and the start winding for several milliseconds until heat internally generated within the element raises the temperature of the element above the anomaly temperature, the concomitant rise in resistance effectively cutting off current flow through the element and the start winding, a protector comprising a movable and a stationary contact, a thermostatic member having a set and a reset temperature operatively connected to the movable contact and adapted to move the movable contact into and out of engagement with the stationary contact when it rises to the set temperature and falls to the reset temperature respectively, the contacts interposed between the source of power and the motor so that upon disengagement of the contacts the motor is deenergized, the PTC element and the protector being thermally coupled to one another with a selected thermal resistance *between approximately 5°-9° C./watt*, the PTC element having a substantial thermal mass whereby upon deenergization of the motor heat will flow to the protector keeping the thermostatic member above its reset temperature for an extended period of time.

[11. Refrigeration apparatus according to claim 10 in which the thermal resistance is between approximately 5°-9° C./watt.]

12. Refrigeration apparatus according to claim [11] *10* in which the thermal resistance is approximately 7° C./watt.

13. In a motor protector having a thermostatic element movable from a contacts closed position to a contacts open position at a given first temperature of the element to thereby deenergize a motor coupled to this protector and interrupt heat generated in the motor and movable from the contacts open position to a contacts closed position at a given second temperature to thereby reenergize a motor coupled to this protector, the second temperature lower than the first temperature the method of increasing time required for the element to cool from the first temperature to the second temperature comprising the steps of selecting a resistor having a steeply sloped positive temperature coefficient of resistivity at temperatures above an anomaly, providing a source of power for the resistor, and thermally coupling the resistor to the thermostatic element *with a thermal resistance between approximately 5°-9° C./watt.*

14. The method according to claim 13 including adjusting the thermal coupling of the resistor and the thermostatic element to increase the time required for the element to cool and the thermal capacity of the resistor from the first temperature to the second temperature within a range from 50% to 300% compared to the resistor element having essentially no thermal coupling with the thermostatic element.

15. The method according to claim 13 including adjusting the thermal coupling of the resistor and the thermostatic element so that the ambient temperature in the vicinity of the thermostatic element under steady state conditions of operating is raised not less than 10° C. and not more than 60° C. compared to a thermostatic element having essentially no thermal coupling with a resistor element.

* * * * *